United States Patent
Lovell et al.

(10) Patent No.: US 8,172,177 B2
(45) Date of Patent: May 8, 2012

(54) STABILIZED UAV RECOVERY SYSTEM

(75) Inventors: Gibert H. Lovell, Columbia, MD (US);
Eric Chi-Kai Hui, Olney, MD (US);
Merrill Keith Umbreit, Chambersburg, PA (US)

(73) Assignee: Advanced Technology & Research Corp., Columbia, MD (US)

( * ) Notice: Subject to any disclaimer, the term of this patent is extended or adjusted under 35 U.S.C. 154(b) by 368 days.

(21) Appl. No.: 12/455,323

(22) Filed: Jun. 1, 2009

(65) Prior Publication Data

US 2009/0294584 A1    Dec. 3, 2009

Related U.S. Application Data (60) Provisional application No. 61/130,699, filed on Jun. 2, 2008.

(51) Int. Cl.
*B64F 1/02*    (2006.01)
(52) U.S. Cl. .................................................. 244/110 F
(58) Field of Classification Search ............. 244/110 C, 244/110 E, 110 F, 115, 63, 135 A
See application file for complete search history.

(56) References Cited

U.S. PATENT DOCUMENTS

| | | | | |
|---|---|---|---|---|
| 4,523,729 A | * | 6/1985 | Frick | 244/115 |
| 7,410,125 B2 | * | 8/2008 | Steele | 244/110 E |
| 7,578,467 B2 | * | 8/2009 | Goodrich | 244/110 C |
| 2007/0051849 A1 | * | 3/2007 | Watts et al. | 244/110 F |

* cited by examiner

*Primary Examiner* — Rob Swiatek
*Assistant Examiner* — Valentina Xavier
(74) *Attorney, Agent, or Firm* — Hyra IP, PLC; Clifford D. Hyra (57) ABSTRACT

A stabilized UAV recovery system is disclosed. In the illustrative embodiment for UAV recovery over water, the system includes ship-based elements and UAV-based elements. The ship-based elements include a robot arm that holds a capture mechanism over the side of the ship while compensating for wave-induced ship motion. The UAV-based elements include a hook mounted to the top of the UAV fuselage. With the capture mechanism held stable from the perspective of a UAV approaching from behind or in front of the mechanism, the UAV is flown under it, snagging an arresting line with the hook. With continued forward motion of the UAV, the arresting line pulls out of a winch drum that is coupled to a brake, bringing the UAV to rest.

10 Claims, 14 Drawing Sheets

STABILIZED UAV RECOVERY SYSTEM

RELATED U.S. APPLICATION DATA

Provisional Application No. 61/130,699, filed Jun. 2, 2008.

FEDERALLY SPONSORED RESEARCH

The invention that is the subject of this application was developed with federal funding through to the Small Business Innovation Research (SBIR) program. Accordingly, the applicant retains its rights to the intellectual property created, subject to the standard patent rights clause as set forth in the Code of Federal Regulations at 37 CFR 401.14. Under this clause the U.S. Government has a nonexclusive, nontransferable, irrevocable, royalty-free license to practice the invention for U.S. Government purposes only.

FIELD OF THE INVENTION

The present invention relates to systems for recovering unmanned aerial vehicles (UAVs).

BACKGROUND OF THE INVENTION

UAVs are widely used for military and non-military uses. Roles for UAVs include reconnaissance and offensive strike missions. Adoption of UAVs for use aboard ships, however, is limited largely because of the challenges of recovery at sea. The challenges include small flight decks and wave-induced ship motion.

Methods of recovery that have been employed at sea include deck-mounted nets and water landings. Drawbacks to net-based capture include the risk of damage to the UAV and the potential for the UAV to be ensnared in the net. Drawbacks to water landing include the necessity to modify the UAV heavily for water landings and the need to recover the UAV from the water after landing.

Other systems for shipboard UAV recovery, based instead on arresting lines, are disclosed in U.S. Pat. Nos. 7,059,564 and 7,219,856. The disclosed system in U.S. Pat. No. 7,059,564 includes a cable hanging vertically from a boom extending out over the side of the ship. The UAV with special fastener devices at the wing tips is flown into the hanging cable and then captured when the cable slides into one of such devices and becomes attached to the cable. The disclosed system in U.S. Pat. No. 7,219,856 includes a boom that holds a line over the side and parallel to the deck of the ship. The UAV with an attached hook that is disclosed in U.S. Pat. No. 7,143,976 is flown above the line and then captured when the hook snags the line. These recovery systems offer distinct advantages over net-based and water landing methods. An important advantage over the net-based method offered by both of these systems is that recovery occurs over the side of the ship, which reduces the risk of collision with the ship and allows recovery to occur outside the area of most intense turbulence caused by the air wake of the ship superstructure. A drawback of the system disclosed in U.S. Pat. No. 7,059,564 is that the UAV must be designed to accommodate a severe turning moment caused by the arresting line force exerted on a wing tip. In addition, the airframe of the UAV must be heavily modified so that the leading edges of the airframe and wings can withstand impact with the hanging cable and that the cable can slide reliably to a wing-tip fastener. This system has been successfully operated using small UAVs (i.e., under 50 lbs. weight), but is unlikely to be scalable to UAVs of middle or large size (e.g. 200-1000 pounds), due to the higher energies involved in turning moments and cable impacts when masses are greater, yet fixed materials strength. A drawback of the system disclosed in U.S. Pat. No. 7,219,856 is that it cannot accommodate significant vertical flight path errors that are caused by wind buffeting or guidance errors. In addition, the boom will rotate upwards and downwards as the ship rolls and heaves, seriously complicating the hook capture task. A further drawback of both of these recovery systems is that, after arrest, the UAV is left dangling in a near-vertical orientation, thus complicating handling and placement on deck.

As a consequence, there is a need for a UAV recovery system that, in addition to the capability of capturing a UAV over the side of a ship, can accommodate a wide range of UAV sizes, large, wave-induced ship motions, and substantial vertical flight path errors of the incoming UAV, and can easily handle the UAV after capture.

SUMMARY OF THE INVENTION

The illustrative embodiment of the invention is a system for recovering an airborne UAV that avoids many of the drawbacks of prior art systems.

In the illustrative embodiment, the UAV recovery system is configured for use on a ship. In that configuration, the recovery system includes the following: a computer-controlled robot arm that is mounted or temporarily secured to the deck and that has a kinematic arrangement of links and joints that is similar to that of a backhoe; a capture mechanism that is mounted on the free end of the robot arm and that includes an arresting line and a winch that pays out and rewinds the arresting line in a controlled fashion during the UAV recovery process; a ship motion sensor such as an inertial measurement unit (IMU) that enables the robot arm to compensate for ship motion prior to capture; a UAV position sensing system that provides real-time estimates of the position of the UAV relative to the capture mechanism, the estimates of which are used for both UAV control and capture mechanism control; a transceiver that sends commands to the UAV guiding it towards the capture mechanism; and an arresting hook that is mounted to the top of the UAV fuselage. The capture mechanism also includes an actuated revolute joint that allows the capture mechanism to be commanded to rotate such that the height of the arresting line segment that is to be snagged by the hook can be varied rapidly. Horizontal positioning errors are accommodated in the same manner as used for over 80 years in tailhook landing systems: by presenting a sufficient length of horizontal cable to the UAV hook. The UAV position sensing system is used in the control of both the UAV and the capture mechanism prior to capture. Arrest is initiated when the UAV snags the arresting line with its top hook.

Prior to UAV recovery, the robot arm is positioned such that the capture mechanism is over the side of the ship and above the level of the deck. Using the sensed position of the UAV relative to the capture mechanism, the UAV is commanded along a flight path that passes below the capture mechanism such that the arresting hook would snag the arresting line. If there is wave-induced ship motion, the robot arm is commanded to compensate for the motion, holding the capture mechanism stable from the perspective of a UAV approaching from directly behind, or directly in front, of the mechanism. The robot arm controller relies on inputs provided by a ship motion sensor in order to provide the ship motion compensating commands to the robot arm actuators. If there is error relative to the commanded flight path, such as from wind-induced buffeting of the UAV, the capture mechanism is rotated via commands from the robot arm controller to compensate for the rapid vertical perturbations of the UAV about its commanded flight path during the final seconds prior to capture. To provide this compensation, the robot arm controller relies on input from the UAV position sensing system. This function is analogous to a baseball catcher adjusting his mitt for observed errors in ball trajectory relative to the requested pitch. Thus, prior to capture, the robot arm provides a stable target for the UAV regardless of ship motion and the capture mechanism provides automatic compensation of vertical flight path errors. A byproduct of the approach for compensating for UAV height variations is that residual vertical positioning errors of the capture mechanism by the robot arm may also be compensated.

When the approaching UAV reaches the capture mechanism, the hook snags a horizontal segment of the arresting line that is held between two posts. This horizontal segment is part of a loop that pulls away from the posts after the arresting hook snags the line. The hook in effect is lassoed by the arresting line. As the UAV continues its forward motion, the slack is taken up in the line and the line begins to unwind off of a winch drum that is coupled to the capture mechanism by a brake. The tension in the line provides the arresting force, bringing the UAV to rest. At the conclusion of the arrest sequence, the UAV is held suspended by its top hook on the arresting line, hanging in a near-normal attitude below the capture mechanism and above the water.

After arrest, the brake is released and a motor drives the winch drum causing the top hook with UAV immediately below to be hoisted up tightly against the capture mechanism into a restraining seat. All moving robot arm actuators are then brought to a stop, which, therefore, turns off the capture mechanism stabilization and allows the robot arm with attached UAV to move in concert with the ship. The robot arm is then commanded to place the UAV on the ship deck.

The ability of the recovery system to compensate for both ship motion and vertical position errors between the capture mechanism and the approaching UAV significantly facilitates the recovery of UAVs at sea. This ability reduces the challenges for the guidance and control system of the UAV and substantially increases the probability of successful recovery when seas are not calm. Calm seas are a rarity in realistic naval operations scenarios. In addition, the use of a robot arm and a top capture method facilitates the handling operations for the UAV after capture, which becomes especially important as the size of the UAV to be recovered increases beyond that easily managed by a single deck hand.

The present system can readily be mounted on ground vehicles and used for in-air recovery of UAVs above land when no runways or areas suitable for belly landings exist. Such ground vehicles can be moving or stationary. The system can also be used mounted on the ground. When used on stationary vehicles or on the ground, the arm stabilization function would not be activated.

DETAILED DESCRIPTION

Figure 1:
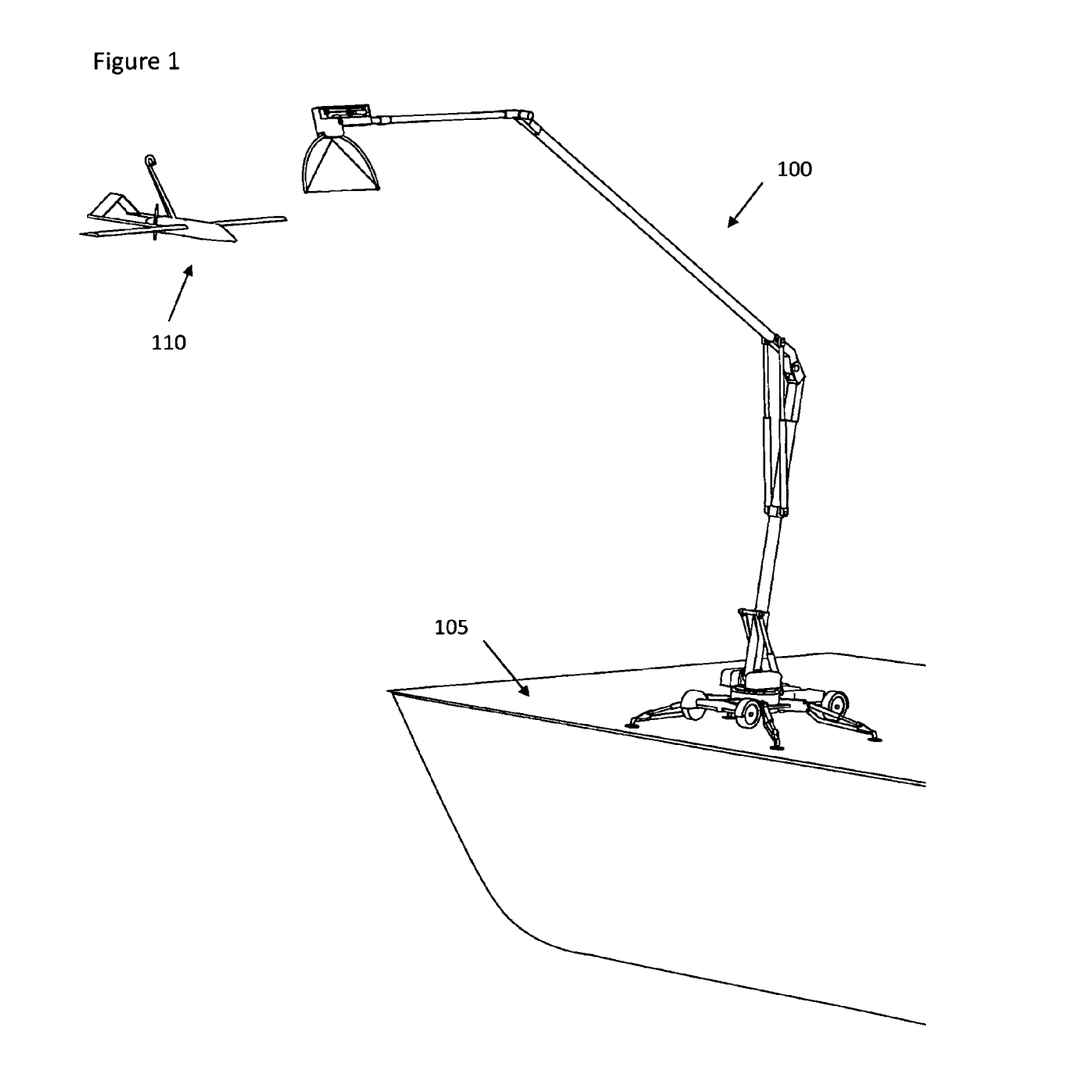
FIG. 1 shows the stabilized UAV recovery system mounted on the deck of a ship and about to capture a UAV.
Figure 2:
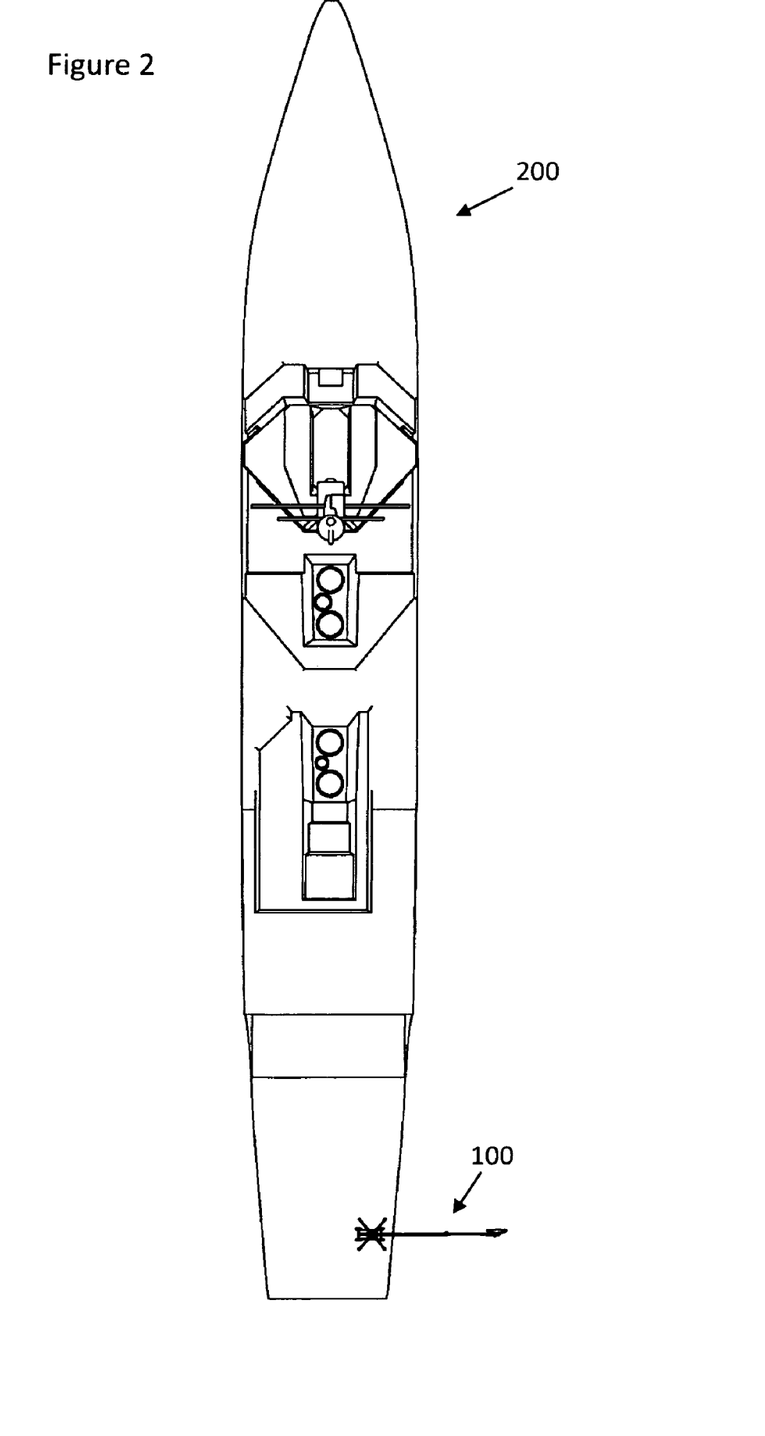
FIG. 2 shows a top view of the ship with the recovery system mounted on the rear deck.

FIG. 1 depicts the stabilized UAV recovery system in accordance with the illustrative embodiment of the present invention. In the illustrative embodiment, UAV recovery system 100 is mounted to deck 105 of a ship to recover UAV 110 at sea. FIG. 2 shows the relative location of UAV recovery system 100 on ship 200. In some other embodiments, the UAV recovery system, with some modification, is mounted to a ground vehicle and used to recover UAVs over land.

Figure 3:
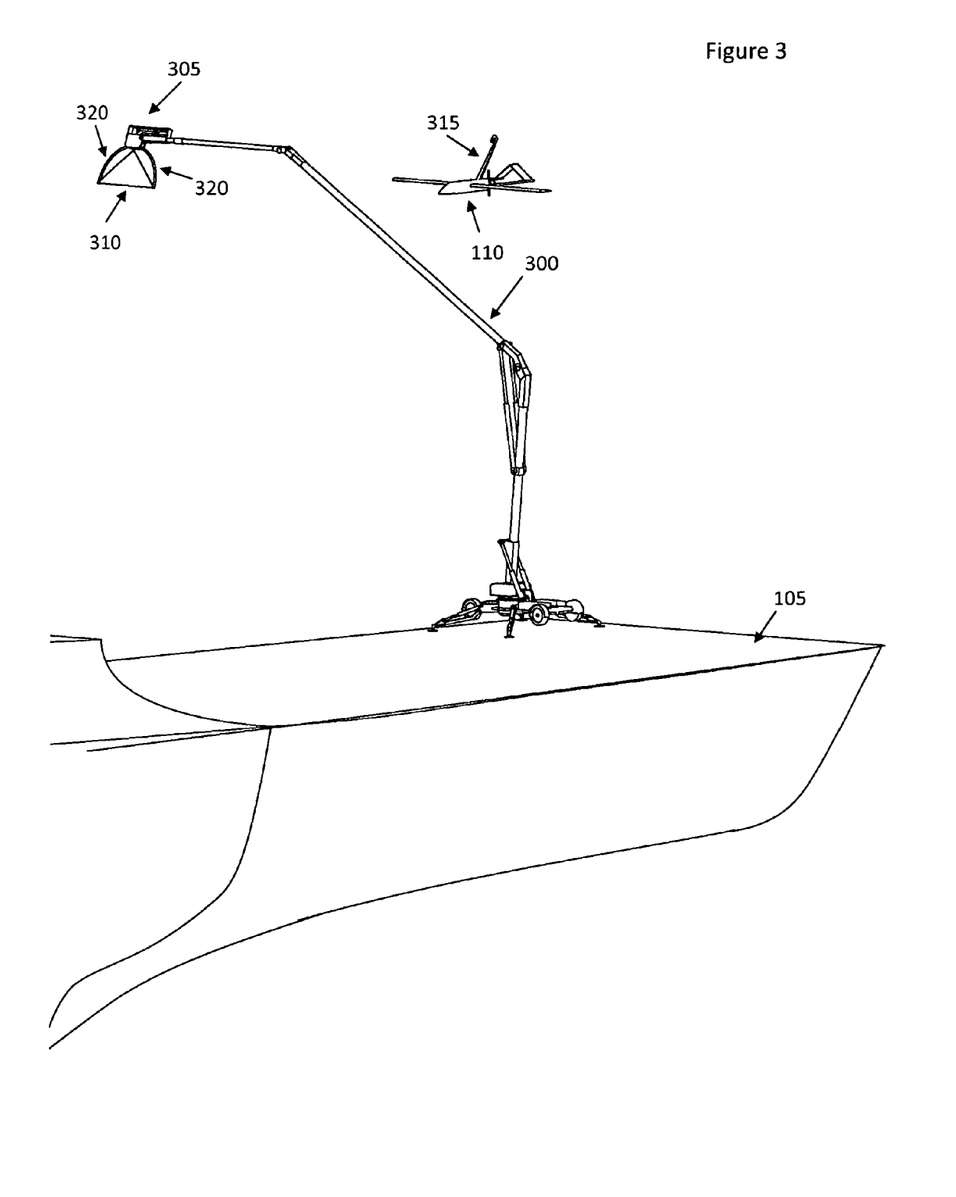
FIG. 3 shows the major components of the stabilized UAV recovery system.

FIG. 3 depicts the major components of the UAV recovery system 100. These components include computer-controlled robot arm 300 and capture mechanism 305. In a fashion similar to aircraft arrest systems on aircraft carriers, capture mechanism 305 presents arresting line segment 310, which is held horizontally, to incoming UAV 110 that is snagged by arresting hook 315 mounted to UAV 110. Arresting line segment 310 is held between two curved posts 320 of the capture mechanism. In contrast to aircraft arrest systems on aircraft carriers, however, there are no loads applied to the UAV structure via landing wheels and the primary recovery loads exerted on the UAV structure are through arresting hook. In the present embodiment of the invention, an arresting hook mounted to the top-side of the UAV (i.e., a roof hook) is assumed.

Figure 4A:
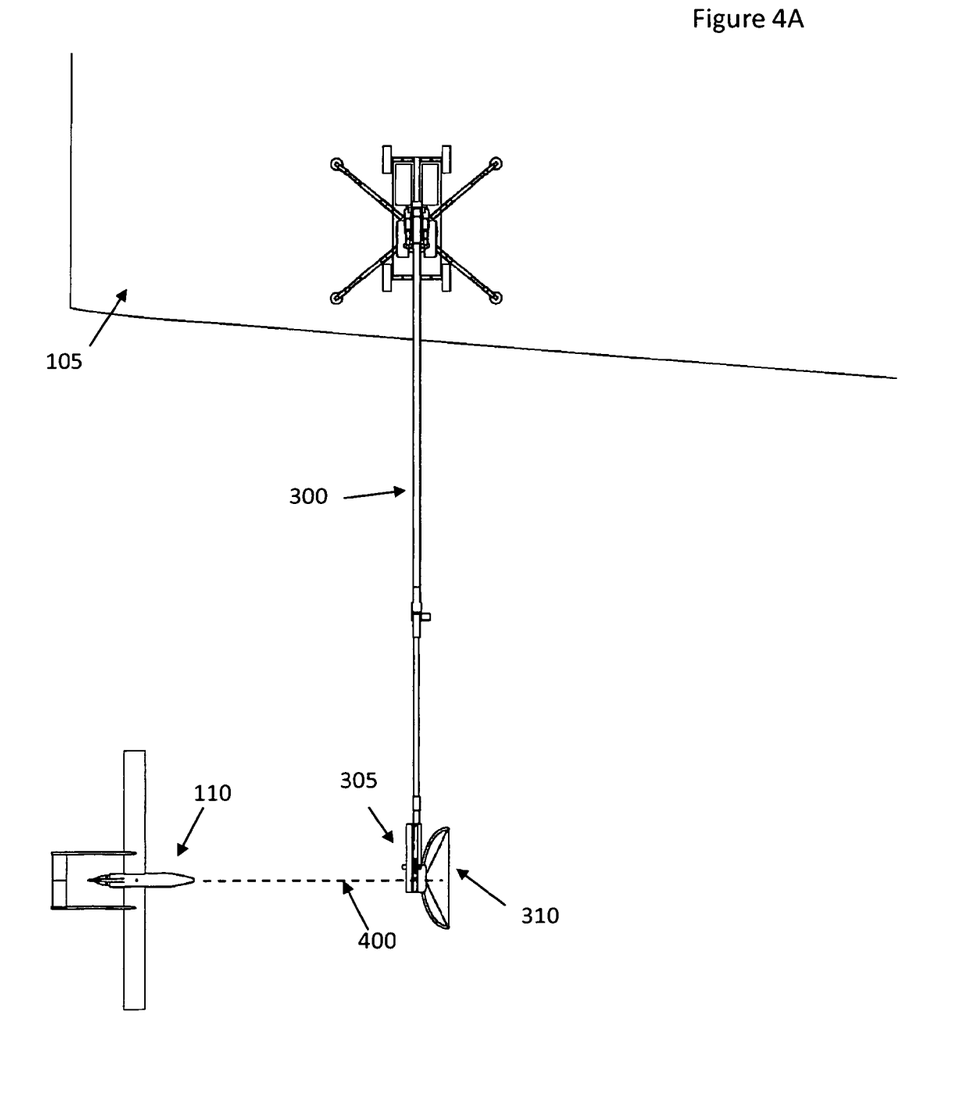
FIG. 4 shows the robot arm holding the capture mechanism over the side of the ship prior to UAV capture.
Figure 4B:
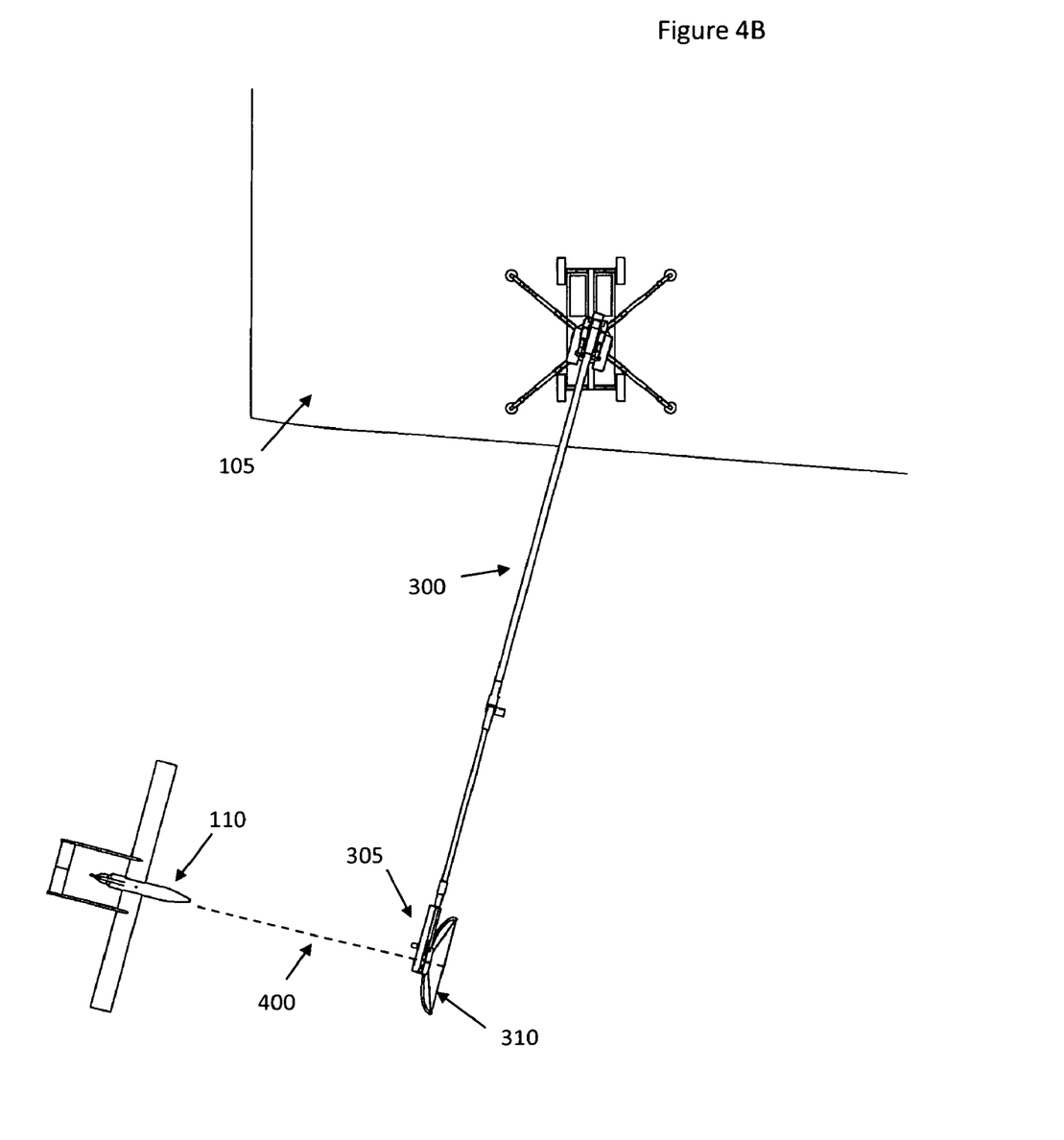

FIGS. 4A and 4B show robot arm 300 holding capture mechanism 305 over the side of the ship prior to capture. Robot arm 300 holds capture mechanism 305 such that the arresting line segment 310 is perpendicular to commanded flight path 400. This is the optimal orientation for capture. In FIG. 4A commanded flight path 400 is parallel to the ship direction and in FIG. 4B commanded flight path 400 is not parallel to the ship direction.

Figure 5:
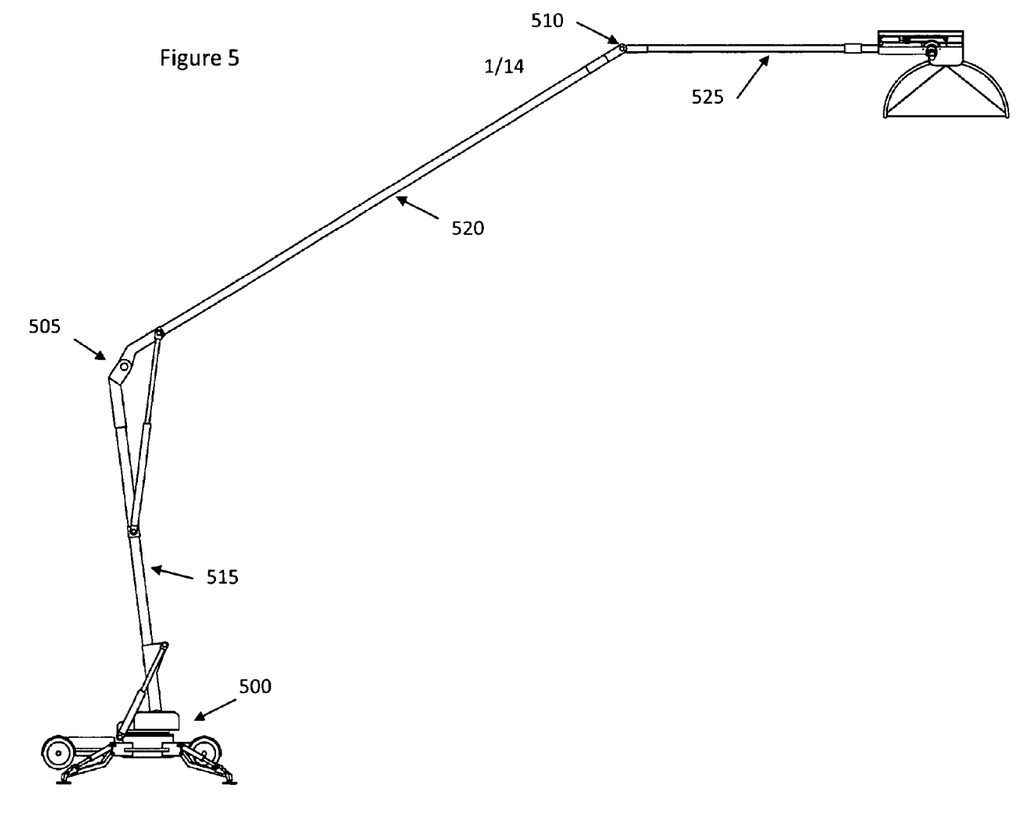
FIG. 5 shows the joints and links of the robot arm.

The function of the robot arm prior to and during UAV capture is to properly position the capture mechanism while reducing greatly the risk of collision between the UAV and robot arm. To provide this function, a variety of kinematic arrangements of links and joints may be used for the robot arm. In the illustrative embodiment, a kinematic arrangement similar to that of the arm of a backhoe is employed. FIG. 5 depicts the major joints and links for the robot arm. These joints are shoulder 500, elbow 505, and wrist 510. Shoulder 500 is a compound revolute joint that comprises a slew joint, which permits rotation about an axis perpendicular to deck 105, and a pitch joint, which permits rotation about an axis parallel to deck 105. Elbow 505 and wrist 510 are both revolute joints whose axes of rotation are each parallel to the shoulder pitch axis of rotation. The links include upper arm 515, forearm 520, and last link 525. All joints are actuated and are under computer control. Design and construction techniques used for man lift devices would generally be appropriate for the robot arm. In contrast to typical man lift devices, however, some of the actuators need to be servo controlled.

Figure 6:
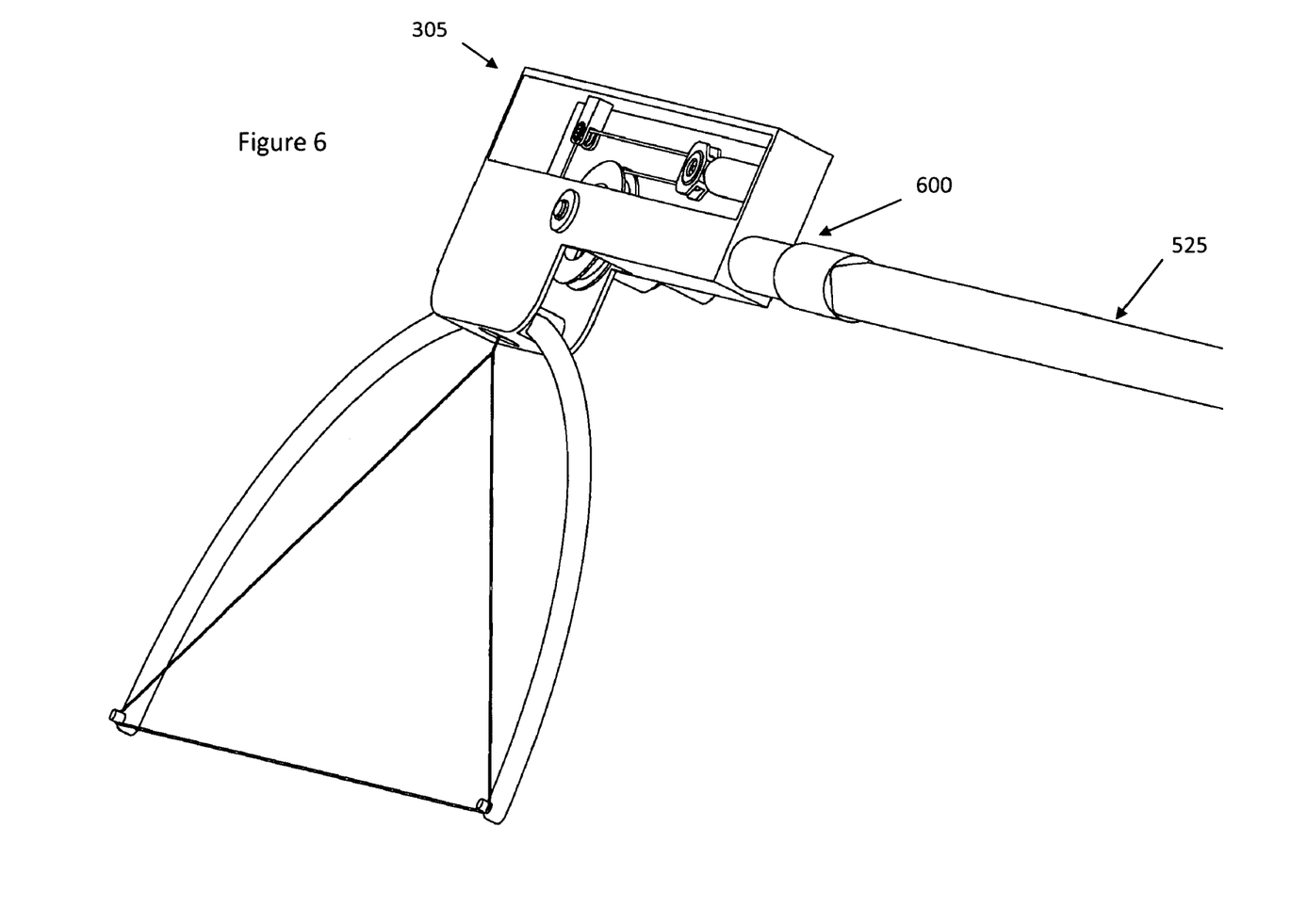
FIG. 6 shows the wrist roll joint.

Specifically, the actuators for the shoulder pitch, elbow, and wrist need to be servo controlled so that the stabilization function described below can be performed. The techniques to design and construct a robot arm with said servo controlled actuators will be known by those skilled in the art. As depicted in FIG. 6, capture mechanism 305 is attached to last link 525 of the robot arm and is coupled to it by wrist roll joint 600, which allows the capture mechanism to rotate about the longitudinal axis of the last link of the robot. The wrist roll joint is actuated by a servo controlled actuator and is controlled by the robot arm computer.

Figure 7:
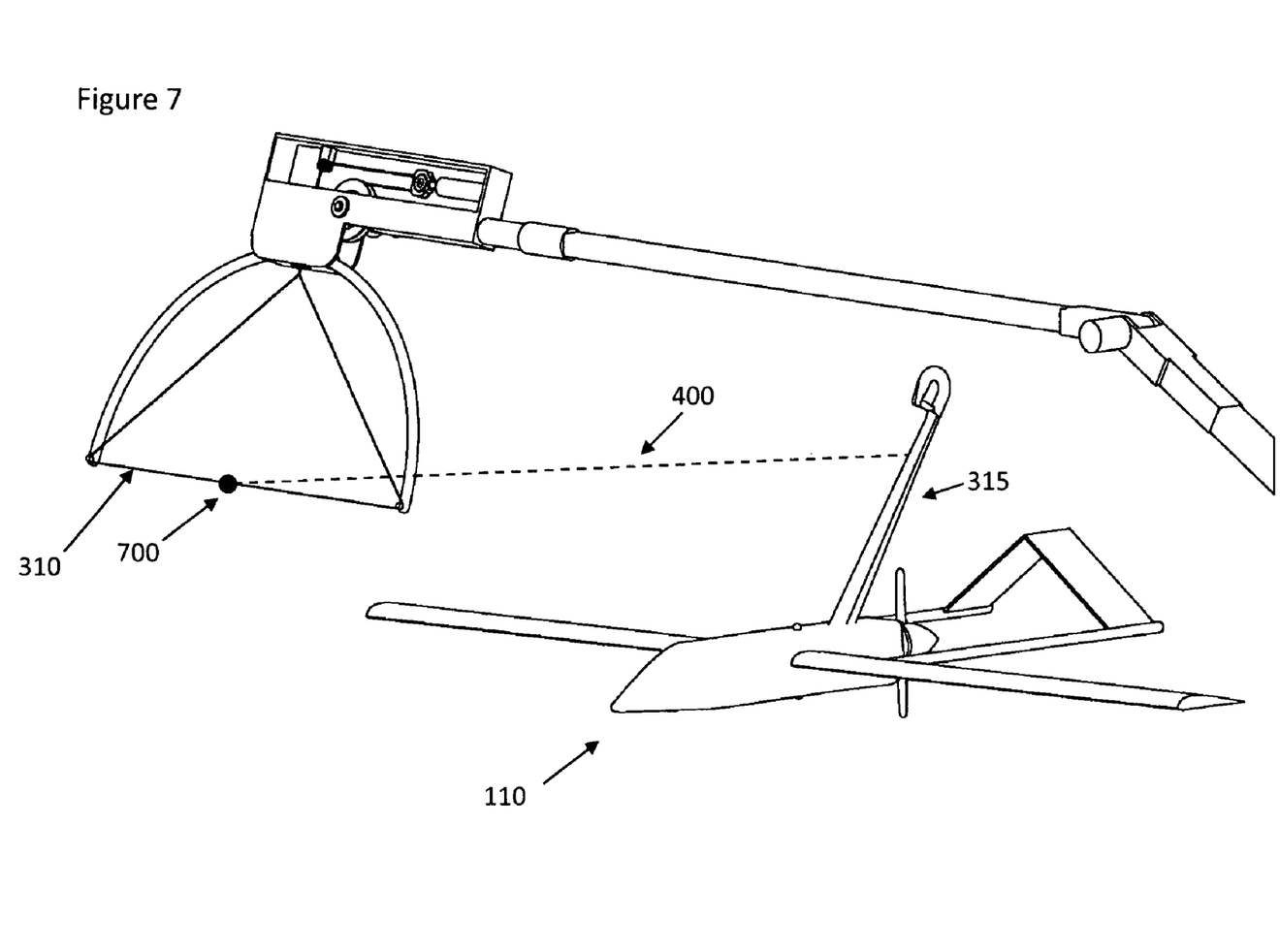
FIG. 7 shows commanded UAV flight path to a target point on the arresting line.

During calm seas, there is no wave-induced ship motion. Furthermore, if the ship heading and forward speed are constant, then the ship will be fixed in an inertial reference frame, which is called the hydrodynamic reference frame. Under these conditions, once the robot arm deploys the capture mechanism for UAV capture, the robot arm joints are then held stationary, which holds the capture mechanism fixed in the hydrodynamic frame and, consequently, fixed with respect to the ship. To begin the recovery operation, the UAV is commanded to follow a flight path that is fixed in the hydrodynamic frame of reference and that ends at the capture mechanism as shown in FIG. 7. Commanded flight path 400 is specified such that arresting hook 315 hits target point 700 when UAV 110 traverses the commanded flight path with no error. Target point 700 is selected as the midpoint of arresting line segment 310.

Figure 8A:
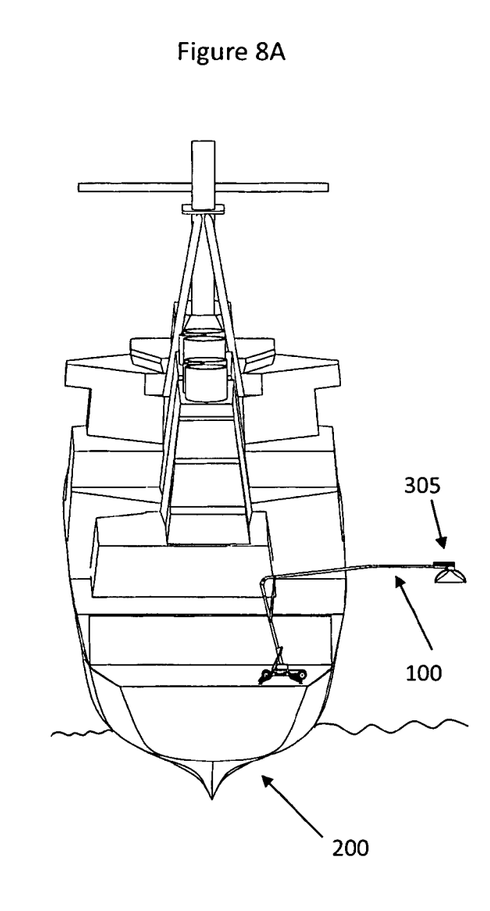
FIG. 8 shows the robot arm stabilizing the capture mechanism during large ship motions.
Figure 8B:
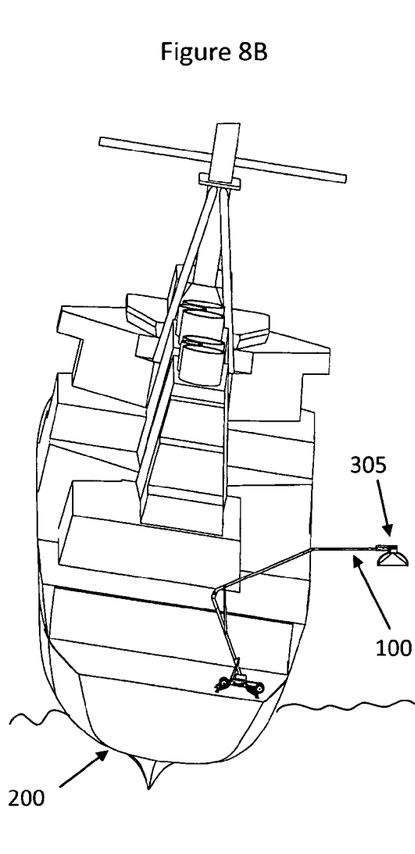
Figure 8C:
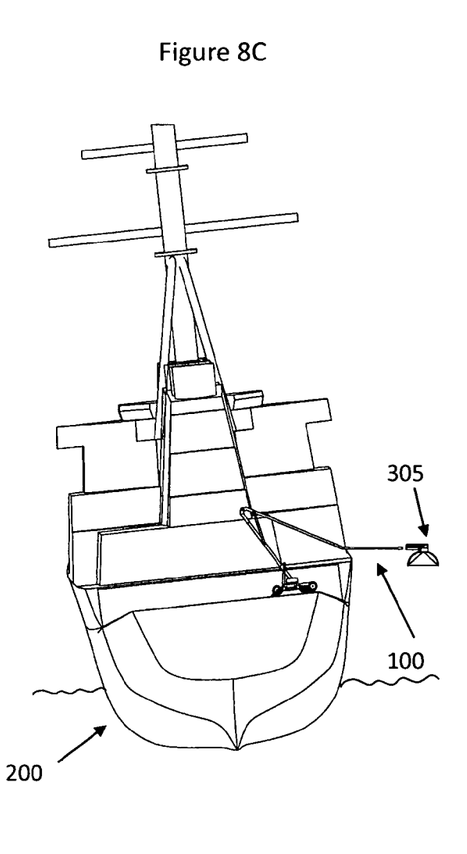

If seas are not calm, the ship will be undergoing wave-induced motions in six degrees of freedom with respect to the hydrodynamic reference frame and the ship therefore would no longer be fixed in an inertial reference frame. With the ship undergoing wave-induced motion, commanding the UAV to the capture mechanism would become much more difficult if the robot arm actuators are held stationary since the capture mechanism would now be in a non-inertial frame of reference. The UAV control problem can be greatly facilitated by controlling the robot arm actuators such that the capture mechanism is held stable in the hydrodynamic reference frame. By relying on a motion sensor such as an inertial measurement unit (IMU) mounted to the ship, the robot arm control computer can generate the proper actuator commands to stabilize the capture mechanism in the hydrodynamic reference frame. The control algorithms to achieve stabilization control will be known by those skilled in the art of robot arm control. By stabilizing the capture mechanism, the method for controlling the UAV is equivalent to that used in calm seas. That is, the commanded flight path can still be specified in the hydrodynamic reference frame. Now, because the present embodiment of the robot arm has less than six degrees of freedom, the robot arm is in fact not capable of fully stabilizing the capture mechanism in inertial space. The arm is capable, however, of keeping the target point on the commanded flight path for the UAV. In fact, only three joints of the robot arm—the shoulder pitch, elbow, and wrist—need to be actively controlled to achieve this. The shoulder slew can be held stationary. FIG. 8 illustrates robot arm 300 stabilizing capture mechanism 305 while ship 200 is undergoing large motions. Although other embodiments of the invention could achieve full stabilization of the capture mechanism, this would result in higher mechanical and motion control complexity for the robot arm and would not lead to further simplification of the UAV control problem.

In order to command the UAV to traverse a flight path to the target point, a real-time estimate of the position of the UAV relative to the capture mechanism is required. This estimate can be provided by a variety of methods including relative GPS. Given this estimate, UAV control commands can be calculated and executed by the UAV flight controller thus guiding UAV 110 to target point 700. Alternatively, the UAV can be flown by a human operator to the target point using video provided by a camera mounted on the UAV. Sensor technology to provide this UAV position estimate does exist and has been implemented for net-based shipboard UAV recovery.

Figure 9:
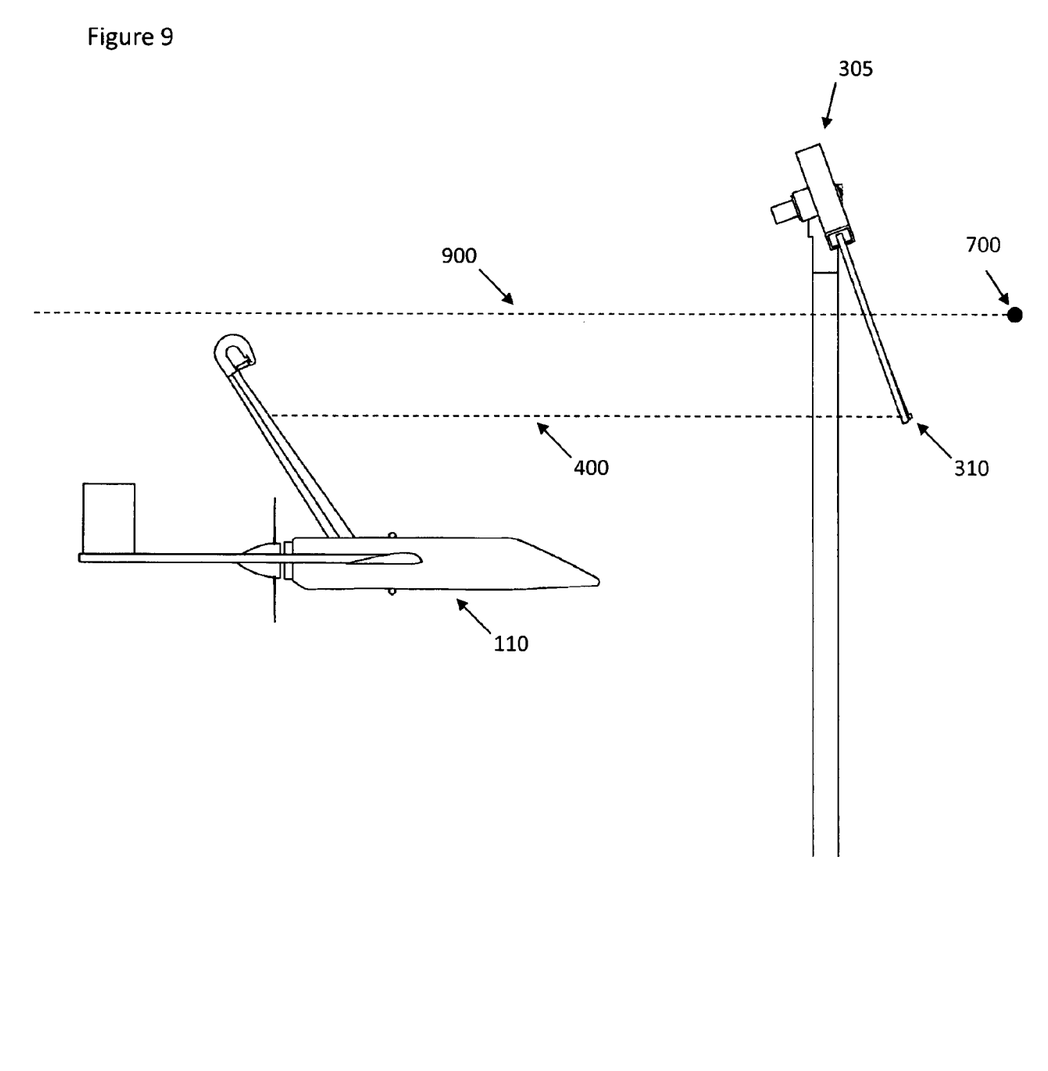
FIG. 9 shows the capture mechanism rotated in order to compensate for a vertical flight path error.

The UAV will not follow exactly the path along which it is commanded. Flight path errors, especially in the vertical direction, can be introduced by wind buffeting. The capture mechanism passively compensates for horizontal flight path errors since arresting hook 315 may hit arresting line segment 310 anywhere between posts 320. The arresting hook also provides some passive compensation for vertical flight path errors since the arresting hook will in general snag the arresting line if initial contact is made by the arresting line anywhere along the body of the arresting hook. If additional compensation for the vertical flight path error is required, this can be achieved by actuating wrist roll joint 600 such that the vertical height of arresting line segment 310 matches the vertical height of arresting hook 315. FIG. 9 shows capture mechanism 305 rotated so that predicted actual flight path 900, which differs in height from commanded flight path 400, intersects arresting line segment 310. If there were no flight path error, then capture mechanism 305 would be rotated such that arresting line segment 310 would contain target point 700. In order to provide this active compensation, however, it is necessary to sense the height of the UAV in the final seconds before capture. This sensing can be achieved by a variety of sensing technologies including computer vision, radar, and LADAR. Candidate mounting locations for this sensor include last link 525 and capture mechanism 305. The sensed height input is provided to the robot arm control computer, which computes the height of the predicted actual path and then sends the proper commands to the wrist roll actuator such that the arresting line segment tracks the height of the predicted actual path 900. Sensor technology to provide this UAV position estimate does exist and has been implemented for net-based shipboard UAV recovery.

An important feature of the present embodiment of the invention is that robot arm actuators are not involved in the active flight path error compensation. The robot arm actuators compensate for ship motion only whereas the wrist roll actuator on the capture mechanism compensates for vertical flight path errors, which in general are higher in frequency than ship motion. The shoulder pitch of shoulder 500, elbow 505, and wrist 510 are actuated such that last link 525 is held approximately stable whereas wrist roll 600 is actuated such that height of arresting line segment 310 tracks the height of the UAV. Thus, anticipated ship motion must be taken into consideration for the design of the robot arm and anticipated flight path error characteristics must be taken into consideration for the design of the wrist roll actuator.

Figure 10:
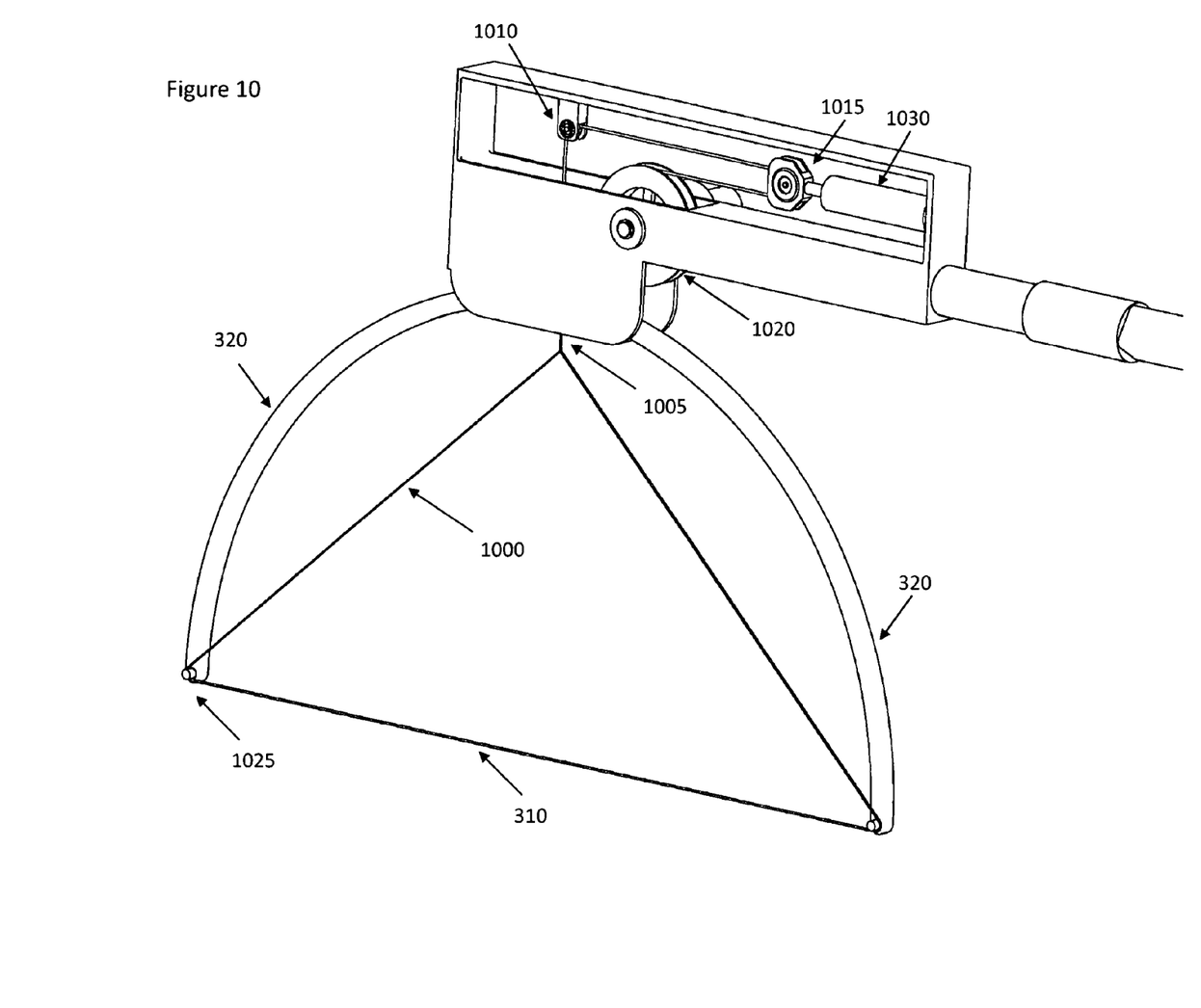
FIG. 10 shows elements of the capture mechanism that pertain to UAV arrest.
Figure 11:
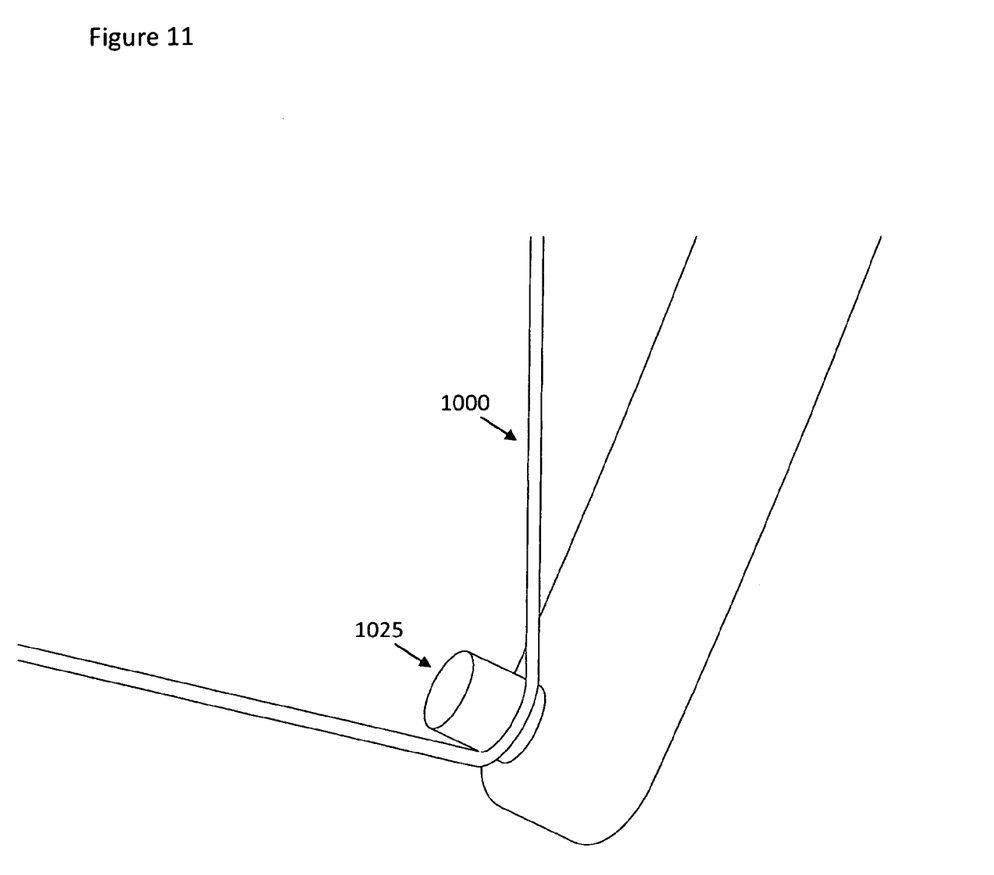
FIG. 11 shows a close-up view of the arresting line pulled against the stem.

Once the arresting hook snags the arresting line, then the capture mechanism must bring the UAV to rest. FIG. 10 illustrates aspects of capture mechanism 305 that pertain to the arresting function. Capture mechanism 305 is shown in its configuration prior to UAV capture. Arresting line segment 310 belongs to arresting line loop 1000 and the remainder of the arresting line is attached to arresting line loop 1000 at splice 1005. Starting at splice 1005, the remainder of the arresting line is reeved through sheave 1010 and sheave 1015 and then wrapped on winch drum 1020 such that the loop is pulled tight against stems 1025 at the end of posts 320. Sheave 1015 is attached to the rod of linear shock absorber 1030, which is used for both holding a tension in the arresting line prior to capture and snatch load mitigation at the start of UAV arrest. Winch drum 1020 is coupled to a brake that is engaged prior to capture thus maintaining tension in the arresting line so that it remains pulled against stems 1025. FIG. 11 shows a close-up view of the arresting line loop 1000 pulled against stem 1025.

Figures 12A, 12B, 12C, 12D:
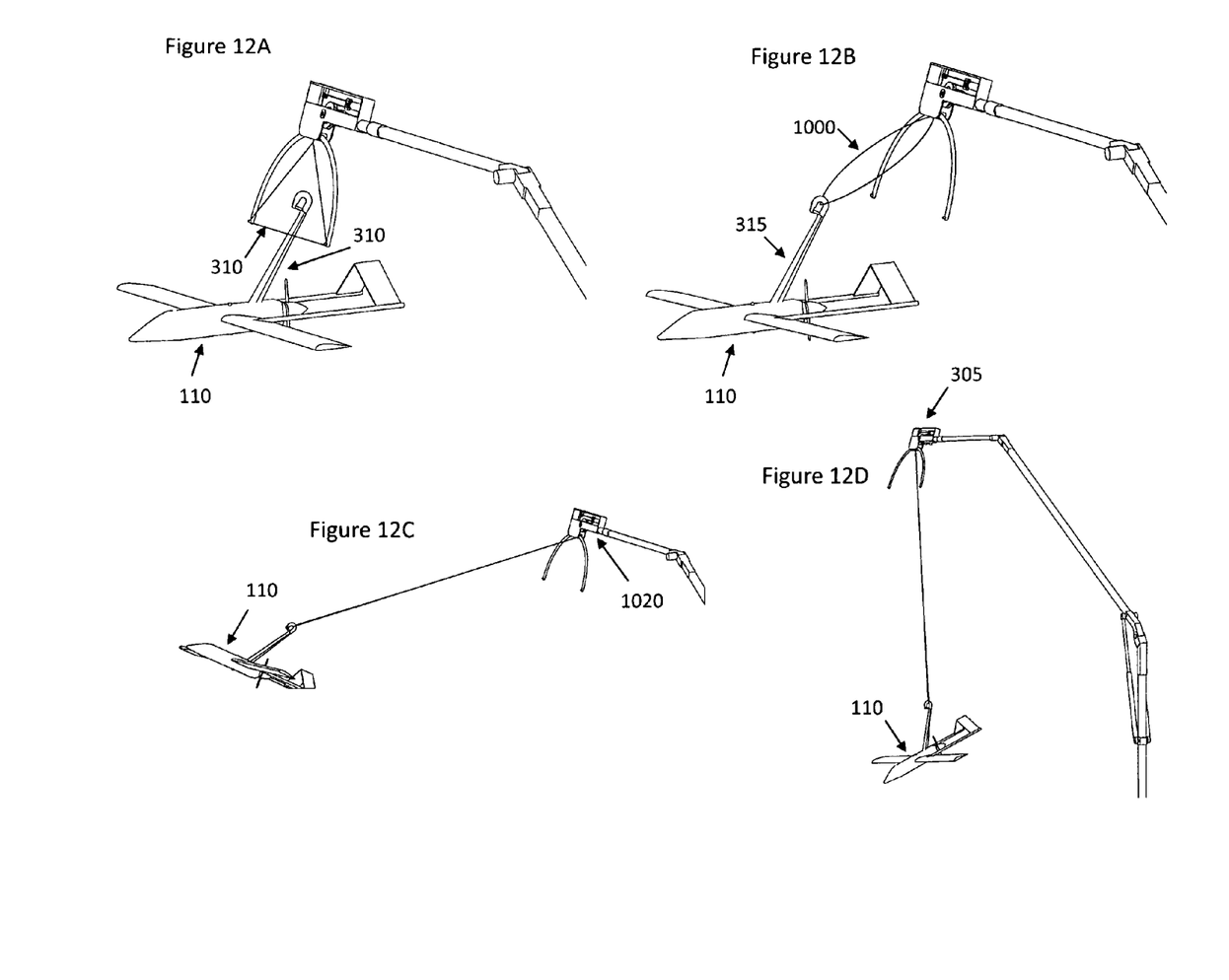
FIG. 12 shows the capture mechanism during UAV arrest.

FIG. 12 shows the arrest sequence. FIG. 12A shows initial contact between arresting hook 315 with arresting line segment 310. As UAV 110 continues forward motion, the arresting hook pushes the arresting line loop 1000 off of stems 1025 after which the arresting line becomes momentarily slack. FIG. 12B shows arresting line loop 1000 snagged in arresting hook 315 while the arresting line is slack. As UAV 110 continues its forward motion, the slack arresting line will pull tight at which point shock absorber 1030 extends its rod with attached sheave 1015 thus mitigating snatch loading. UAV arrest begins once the arresting line is pulled tight. FIG. 12C shows UAV 110 as it is arrested by pulling line off of winch drum 1020 with brake engaged. As the winch drum is rotating and paying out line, the brake remains engaged providing a constant torque, which results in a constant tension in the arresting line and hence constant magnitude arresting force applied to the UAV. FIG. 12D shows UAV 110 at rest under capture mechanism 305 and above the water. When the UAV is at rest under the capture mechanism, the tension in the line will equal the weight of the UAV with the brake providing the requisite torque to prevent winch drum rotation.

Figure 13:
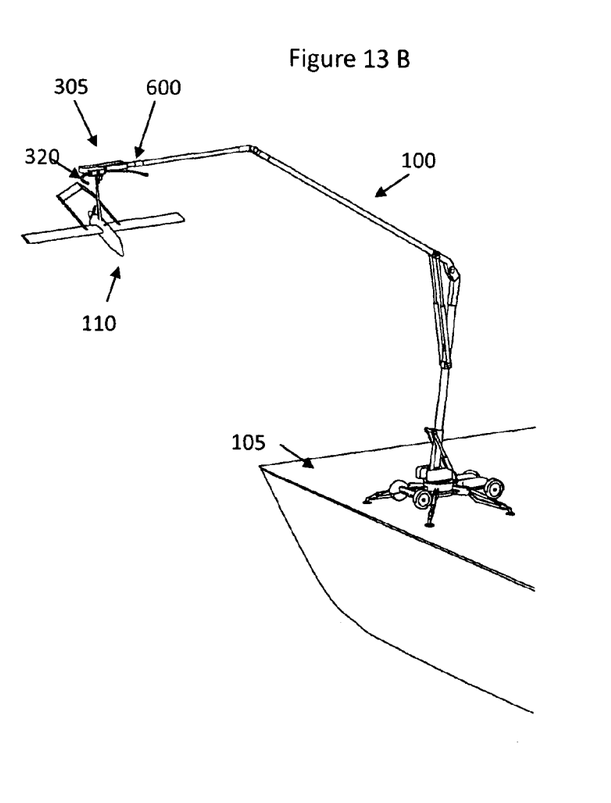
FIG. 13 shows the hoisting and transfer of the captured UAV to the ship deck.

FIG. 13 shows operations of UAV recovery system 100 after the UAV 110 is captured. FIG. 13A shows UAV 110 suspended below the capture mechanism. FIG. 13B shows UAV 110 hoisted up to capture mechanism 305 by rotating winch drum 1010 with a winch motor. Capture mechanism 305 has been rotated via wrist roll 600 prior to the hoisting of UAV 110 in order that posts 320 are clear of UAV 110 when it is hoisted up. With the UAV hook hoisted up tightly to a seat in the capture mechanism, stabilization can be turned off. FIG. 13C shows UAV recovery system 100 placing UAV 110 on deck 105.

The invention claimed is:

1. An apparatus for airborne capture of an unmanned aerial vehicle (UAV) on a ship, the apparatus comprising the following:
   a UAV capture mechanism with two attached posts between which a horizontally disposed portion of arresting line is held prior to UAV capture;
   a robot arm wherein a free end of the robot arm is attached to the said capture mechanism and the base of the robot arm is mounted to the ship and wherein said robot is capable of compensating for wave-induced ship motion, thereby holding said capture mechanism stable for approaching UAV; and
   an arresting hook mounted to said UAV that snags said horizontally disposed portion of arresting line when said UAV reaches said capture mechanism;
   wherein the capture mechanism comprises the following:
      a fixed length loop of arresting line that includes the horizontally disposed portion of arresting line;
      an open length of arresting line, one end of which is attached to the said loop;
      a rotating winch drum about which said open length of arresting line is wrapped;
      a brake that can apply a resistive torque to said winch drum;
      a motor that can rotate said winch drum; and
      attachments at the ends of the posts that hold the said loop prior to UAV capture and allow said loop to be pulled free from said posts by an arresting hook of an approaching UAV.

2. The apparatus of claim 1 wherein the robot arm has a serial kinematic structure with four actuated revolute joints wherein the robot base is attached to the deck of ship; the axis of the first joint, which couples the base to the first moving link, is perpendicular to the deck; and the axes of the second, third, and fourth joints are parallel to each other and perpendicular to the axis of the first joint.

3. The apparatus of claim 1 further comprising the following two sensing devices: a UAV sensing device that provides a real-time estimate of the position of the UAV relative to the capture mechanism and a ship motion sensing device that provides a real-time estimate of the ship position in an inertial reference frame.

4. The apparatus of claim 3 further comprising a processor that receives the signals of said UAV sensing device and the signals of said ship motion sensor and that sends flight path commands to the UAV and that sends actuator commands to the actuators of the robot arm and capture mechanism.

5. The apparatus of claim 2 wherein the angle of the first revolute joint can be positioned such that the second joint axis is substantially parallel to expected flight path direction just prior to capture.

6. A method for airborne capture of a UAV comprising the following:
   directing the UAV, which has an attached arresting hook, to a horizontally disposed portion of arresting line held by attachment devices at the ends of two posts of the capture mechanism wherein said capture mechanism is held by a robot arm that compensates for ship wave-induced motion such that said capture mechanism is a stable target for said approaching UAV;
   after said arresting hook makes contact with the said horizontally disposed portion of arresting line, coupling said arresting hook to said horizontally disposed portion of arresting line wherein said arresting line is first pulled free of said attachment devices by said arresting hook, is momentarily slack, and then becomes taut, snaring the hook;
   pulling arresting line off of the winch drum as the UAV continues its forward motion while the rotary brake that is coupled to said winch drum provides braking torque to the said winch drum thus decelerating said UAV until it is at rest; and
   suspending said UAV with the arresting line below the capture mechanism with said brake preventing rotation of said winch drum.

7. The method of claim 6 wherein, prior to UAV capture, the sensed ship motion is input to the processor and the processor calculates and outputs the proper commands to the actuators of the robot arm such that the capture mechanism is a stable target for the approaching UAV.

8. The method of claim 6 wherein, prior to UAV capture, the sensed UAV position is input to the processor and the processor calculates and outputs the proper commands to the capture mechanism revolute joint actuator such that the vertical height of the portion of the horizontally disposed arresting line between the posts of the capture mechanism matches the vertical height of the arresting hook in the final seconds before capture.

9. The method of claim 6 wherein, after UAV capture, the following operations are performed: the brake that is coupled to the winch drum is disengaged, the motor that is coupled to the winch drum rotates said winch drum thus hoisting said UAV up to the capture mechanism, and the said brake is re-engaged; the actuators of the robot arm are commanded to stop thus turning off ship motion compensation; said robot arm then moves said UAV to a location on the deck of the ship.

10. The apparatus of claim 1 used on a ground vehicle or stationary ground site rather than a ship.

* * * * *